United States Patent Office 3,598,773
Patented Aug. 10, 1971

3,598,773
THERMOSETTING PROTEIN RESIN COMPOSITION COMPRISING AN AQUEOUS SOLUTION OF AN ANIMAL PROTEIN, UREA OR OTHER CARBAMIDE, AND AN ALDEHYDE
Thomas F. Mitchell, Arlington Heights, and Algird S. Pakeltis, Lemont, Ill., assignors to Darling & Company, Chicago, Ill.
No Drawing. Filed Sept. 30, 1968, Ser. No. 763,960
Int. Cl. C08g *37/32;* C09h *11/00;* C09j *3/00*
U.S. Cl. 260—6
8 Claims

ABSTRACT OF THE DISCLOSURE

An improved protein-amine-aldehyde resin composition and particularly an animal glue-urea-formaldehyde resin composition which is thermosetting and forms a strong adhesive bond having good water, oil, heat and abrasion resistance and which is especially suited for use in the manufacture of sandpaper and which also has general application as an adhesive or size for paper, cloth, wood, metal and vitreous materials.

---

Readily water soluble animal proteins, such as animal glue, gelatin and similar collagen derived water soluble proteins, consist of long chain polyamino polyamides. These chains are flexible random coils and consist of about 100 amino acid units joined together, although the number of units can vary over a wide range. The molecular structure is more complex than most synthetic polymers since it comprises eighteen different types of amino acids. Some of these produce charged groups, both positive and negative, distributed along the length of the chain. These charges, which vary in number are responsible for many of the properties of the material. At temperatures over 35° C.–40° C. these molecules exist in water in true solution, as separate entities.

Various resin products of the readily water soluble animal proteins, such as glue or gelatin, with an amine and particularly a carbamide, such as urea, and an aldehyde, such as formaldehyde, have been prepared heretofore by reacting these ingredients under various conditions and in various proportions, and the reaction products have found use as adhesive materials. While these adhesive products are improvements over the straight urea-formaldehyde resins in some respects, the glue adhesive resins of the prior art do not exhibit the adhesive bonding strength, and resistance to water, oil, heat and abrasion which is frequently required. Accordingly, improved glue resin products are desired by the sandpaper industry, as well as by the manufacturers of wood laminates and fiber board manufacturers, which require an adhesive bond having a high tensile strength and resistance to water, oil, heat and abrasion.

It is therefore an object of the present invention to provide an improved readily water soluble animal protein-carbamide-aldehyde thermosetting resin product which has good adhesive properties and is highly resistant to water, oil, heat and abrasion.

It is also an object of the present invention to provide an improved sandpaper product utilizing an animal protein resin in which a water soluble animal protein is reacted with a carbamide and an aldehyde to form a heat polymerizable resin product.

It is a further object of the present invention to provide an improved method of making an animal protein resin product.

Other objects of the present invention will be evident to those skilled in the art from the specification and claims to follow.

The well-known mechanism for liquifying glue with urea and for insolubilizing glue with formaldehyde bonds involves reactions with the glue molecule at the sites of hydrogen bonding. The diversity of the effect of reacting a carbamide, such as urea, and an aldehyde, such as formaldehyde, with an animal protein, such as glue or gelatin and the like, collagen derivatives, has been found to depend on the form of the glue molecule when the reaction at the sites of hydrogen bonding is effected and the relative proportions in which the glue, urea and formaldehyde reactants are used. Thus, the addition of the urea breaks the hydrogen bonds of the glue molecule resulting in straightening the normally coiled form of the glue molecule, transforming the glue molecule into a linear straight chain. When the aldehyde, such as formaldehyde, is combined with the glue-urea complex the formaldehyde reacts with both the urea and the amino groups of the glue molecule; whereby the glue molecule becomes an integral structural part of the resulting polymer with the glue molecule in the form of a straight chain polyamide rather than as random coils.

When an animal protein, a carbamide and aldehyde are combined in accordance with the present invention a novel adhesive resin product is obtained which does not exhibit the characteristic rapid jelling normally associated with a glue-formaldehyde mixture but does form adhesive bonds with increased tensile strength and flexibility, along with improved water, oil, heat and abrasion resistance.

In preparing the resin product of the present invention it is essential that the animal protein, carbamide and aldehyde ingredients be combined within a limited range of proportions and in a proscribed procedure in order to provide a product having the improved properties of the present invention. Thus, the animal protein and at least about one half of the carbamide used is prepared as an aqueous solution and thereafter the aldehyde is added along with any remaining carbamide to the aqueous solution while the solution is maintained at a moderate temperature below about 110° F. and preferably at a temperature between about 90° F. and 100° F. to form a homogenous composition which is stable for prolonged periods at room temperature and which can be kept indefinitely under refrigeration temperatures without appreciably increasing in viscosity and yet is capable of being heat polymerized to form a strong adhesive bond which is resistant to water, oil, heat and abrasion.

The ratio of the amount by weight of the readily water soluble animal protein material, such as glue or gelatin, to the carbamide material, such as urea and/or thiourea, can be varied from about 0.7 to 1.5. Where maximum resistance to abrasion and heat is required, as in the "make" coating of sandpaper, an excess of glue over urea is preferred and the glue:urea ratio of the latter product is preferably between about 0.7 and 1.0. Where the foregoing properties are not required the ratio of glue to urea can be reduced to between about 1.3 and 1.5.

The ratio of amount of the glue or the like to aldehyde, such as formaldehyde, can be varied from about 0.5 to 2.3 with the products in which the higher ratio obtains exhibiting greater flexibility.

It has also been found necessary to maintain the molar ratio of aldehyde to carbamide within a range of about 1.0 to 1.6, with preferably an excess of aldehyde. In the preferred embodiments at least 1.3 to 1.5 mols of aldehyde (i.e. formaldehyde) is used for each mol of carbamide (i.e. urea).

It is also a characteristic of the products of the present invention that the total amount by weight of carbamide (i.e. urea and thiourea) plus aldehyde is at least equal to the weight of the glue with the ratio of the combined weight of the carbamide plus aldehyde to the weight of the glue ranging between about 1.0 and 2.4, with a ratio of about 1.2 providing particularly good results in sandpaper coatings.

Where the carbamide material in the composition is comprised of both urea and thiourea, as is preferred, the urea and thiourea should be present in about equal amounts, although a slight excess of urea can be used, if desired. The molar ratio of urea to thiourea can vary between about 1.0 and 1.5.

As all of the ratios for the several ingredients have been based on the actual amount of active material, it should be understood that water is used in the amount required to provide a solution having the desired viscosity for the particular application. No water need be removed from the composition during the preparation of the product and prior to the actual application thereof. The viscosity of the product can vary from about 60 cps. to 1400 cps. (Brookfield viscosity) at a temperature of 85° F.

It should also be understood that various inert fillers commonly used in glues and adhesives or other non-reactive material can be combined with the resin product in very substantial amounts without destroying the adhesive properties or significantly impairing other properties thereof. Thus, for example, such nonreactive materials as feldspar can be incorporated in an amount by weight equal to the total solids of the resin product where the product is intended for use as the "size" coating in sandpaper.

In preparing the glue-urea-formaldehyde products of the present invention the urea, thiourea and glue can be dry-mixed and then dissolved in water with heating and stirring, if required, until complete solution is produced and the solution is then cooled, the formaldehyde is then added to the aqueous solution at a temperature about 90°–100° F. with stirring until a homogenous composition is formed, and the composition can be applied at room temperature without further treatment.

When the glue-urea (thiourea)-formaldehyde ingredients are combined in the herein specified ratios and in accordance with the specified procedure, the resulting composition is slightly acidic and does not require the addition of any acids, alkalies, catalysts, hardener or the like additives to control the reaction and the resulting mixture is stable for prolonged periods before significant polymerization takes place.

The following specific examples will further illustrate the present invention without, however, restricting the invention to the specific ingredients or proportions used.

EXAMPLE 1

A resin composition is made from the following ingredients (on an active basis):

|  | G. |
|---|---|
| Glue (90 g. bone) | 585 |
| Urea | 195 |
| Thiourea | 246 |
| Water, total | 1478 |
| Make-up water | 1215 |
| Water of solution | 263 |
| Formaldehyde, as s. sol. | 252 |
| Aircoflex | 244 |

The glue is mixed with about half of the urea (90 g.) and all the thiourea and the make-up water (1215 g.) with stirring and heating to about 140° F. until a complete solution is formed, and the solution is then cooled to 100° F. The Aircoflex dissolved in 200 g. of water is added to the aqueous solution. The formaldehyde along with additional urea and water of solution as a stabilized solution (s. sol.) comprising 60% formaldehyde, 25% urea and 15% water is then stirred into the glue-urea-thiourea aqueous solution while the solution is at a temperature between about 90° F.–100° F. When the composition is homogenous the solution is ready for use.

The resin composition is mixed with finely divided feldspar having a particle size of 50 microns or less (i.e. 1–25 microns) and in an amount equal to one-fourth the total weight of the solids content of the composition when the composition is to be used as the "make" coating in sandpaper. The composition with the feldspar added has a Brookfield viscosity of 820 cps. at 85° F.

EXAMPLE 2

A composition is prepared from the following ingredients:

|  | G. |
|---|---|
| Glue (90 g. bone) | 819 |
| Urea | 274 |
| Thiourea | 261 |
| Water, total | 1289 |
| Make-up water | 1200 |
| Water of solution | 89 |
| Formaldehyde, as s. sol. | 355 |

The above ingredients are combined as in Example 1 and provide a resin composition having a Brookfield viscosity of 1060 cps. at 85° F. with 57% active ingredients content.

The foregoing resin composition is mixed with finely divided feldspar having a particle size 50 microns or less (i.e. 1–25 microns) and in an amount equal to one-fourth the total weight of the solids content of the composition when the composition is to be used as the "make" coating in sandpaper.

EXAMPLE 3

A composition is prepared from the following ingredients:

|  | G. |
|---|---|
| Glue (90 g. bone) | 78 |
| Urea | 26 |
| Thiourea | 33 |
| Water, total | 407 |
| Formaldehyde, as s. sol. | 34 |
| Aircoflex, 55% aq. sol. | 33 |

The resin composition is prepared as in Example 1 and contains 21% active ingredients. When the composition is to be used as the "size" coating of sandpaper it is uniformly mixed with finely divided feldspar in an amount equal to the weight of the total solids content of the composition. The Brookfield viscosity of the composition with the feldspar addition is 460 cps. at 84° F.

EXAMPLE 4

A resin composition is prepared as in Example 1 from the following ingredients:

|  | G. |
|---|---|
| Glue (90 g. bone) | 59 |
| Urea | 39 |
| Thiourea | 49 |
| Water, total | 254 |
| Make-up Water | 201 |
| Water of solution | 53 |
| Formaldehyde, as s. sol. | 50 |
| Aircoflex, 55% aq. sol. | 49 |

When the composition is to be used as the "size" coating for sandpaper, finely divided feldspar is added in an amount equal to the weight of the solids content of the composition. The composition after the feldspar addition exhibits a Brookfield viscosity of 500 cps. at 76° F.

EXAMPLE 5

A composition is prepared from the following ingredients:

| | G. |
|---|---|
| Glue | 819 |
| Urea | 274 |
| Thiourea | 261 |
| Water, total | 1289 |
| Make-up water | 1200 |
| Water of solution | 89 |
| Formaldehyde, as s. sol. | 355 |

The resin composition is prepared as in Example 1 and exhibits a Brookfield viscosity of 610 cps. at 85° F. The active ingredients comprise 57% of total resin composition.

EXAMPLE 6

A composition is prepared from the following ingredients:

| | G. |
|---|---|
| Glue | 109 |
| Urea | 37 |
| Thiourea | 35 |
| Water, total | 272 |
| Make-up water | 260 |
| Water of solution | 12 |
| Formaldehyde, as s. sol. | 47 |

The resin composition is prepared as in Example 1 and, when used as a size coating for sandpaper, includes finely divided feldspar in an amount equal to the weight of solids of the resin composition.

EXAMPLE 7

A composition is prepared from the following ingredients:

| | G. |
|---|---|
| Glue | 19 |
| Urea | 13 |
| Thiourea | 16 |
| Water, total | 34 |
| Make-up water | 30 |
| Water of solution | 4 |
| Formaldehyde, as s. sol. | 17 |

The resin composition is prepared as in Example 1 and exhibits a Brookfield viscosity of 320 cps. at 90° F. and contains 65.6% active ingredients.

EXAMPLE 8

A composition is prepared from the following ingredients:

| | G. |
|---|---|
| Glue | 19 |
| Urea | 13 |
| Thiourea | 16 |
| Water, total | 49 |
| Make-up water | 30 |
| Water of solution | 19 |
| Formaldehyde as s. sol. | 17 |
| Aircoflex, 55% aq. sol. | 18 |

The resin composition is prepared as in Example 1 and exhibits a Brookfield viscosity of 640 cps. at 90° F. and contains 49% active ingredients.

EXAMPLE 9

A composition is prepared from the following ingredients:

| | G. |
|---|---|
| Glue | 87 |
| Urea | 29 |
| Thiourea | 37 |
| Water, total | 190 |
| Make-up water | 181 |
| Water of solution | 9 |
| Formaldehyde, as s. sol. | 38 |

The resin composition, prepared as in Example 1, exhibits a Brookfield viscosity of 160 cps. at 90° F. and contains 50% active ingredients with a 44.3% solids content.

EXAMPLE 10

A composition is prepared from the following ingredients:

| | G. |
|---|---|
| Glue | 19 |
| Urea | 12 |
| Thiourea | 16 |
| Water, total | 35 |
| Make-up water | 7 |
| Water of solution | 28 |
| Formaldehyde (in a 37% aqueous solution) | 17 |

The resin composition is prepared as in Example 1 and exhibits a Brookfield viscosity of 265 cps. at 135° F.

EXAMPLE 11

A resin composition is made as in Example 1 from the following ingredients:

| | Parts |
|---|---|
| Glue | 27.3 |
| Urea | 9.2 |
| Thiourea | 8.7 |
| Water | 43.0 |
| Formaldehyde | 11.9 |

The resin composition exhibits a Brookfield viscosity of 330 cps. at 90° F.

The compositions of Examples 1–6 are applied in the manufacture of sandpaper wherein a substrate, such as paper or cloth, is coated with the indicated adhesive composition (see Table I) and standard grits or abrasive particles are deposited on the wet adhesive and then oven dried or cured in accordance with standard procedure. The first coating or "make" coating with the grit is then covered with a second coating or "size" coating and dried. The adhesive "size" coating is then heat-cured in accordance with standard practice.

In evaluating the sandpapers produced with the products of Examples 1–6, samples of finished product, 3″ x 11″, are placed on each of two cleated rubber wheels of 9½″ circumference. The wheels are made of two half wheels, hinged at midpoint in their circumference. Directly opposite the hinge on the circumference is a concealed self-locking joint with two pins in each face of the joint. One end of the sample is affixed by means of two pins on one face of the joint, and brought tautly around the outside of the wheel, with the grit surface out. The other end of the sample is affixed to the pins in the other face of the joint. The wheel is snapped closed leaving the wheel circumference covered with the same grit face exposed. Both wheels are bolted to opposite ends of a motor driven, constant speed spinning shaft.

Two tared, aluminum, ¾" square bars, clamped to a levered jig are lowered against the spinning wheels at a 90° angle, and constant standard weight pressure for five minutes. The loss in weight of the aluminum bars is called the "cut." It is reported in grams and indicates the ability of the abrasive to grind or cut metal. With a micrometer, the thickness of the samples is determined for both the abraded and unabraded areas at several points. The difference, between the two areas, is reported in inches and is called the "shed." The "shed" is an indication of the durability of the abrasive surface while accomplishing the "cut." The two values together indicate the adhesive strength and durability.

The following Table I gives the test results obtained in comparison with commercial grades of sandpaper using the indicated adhesive materials:

TABLE I

Sandpaper

| Make adhesive used | Size adhesive used | Cut [1] | Shed [2] |
|---|---|---|---|
| Example 1 | Example 3 | 740 | .004 |
| Do | Example 7 | 600 | .002 |
| Example 2 | Example 4 | 670 | .005 |
| Do | Example 7 | 660 | .005 |
| Example 6 | Example 3 | 720 | .007 |
| Animal glue | Epoxy resin | 670 | .007 |
| Do | Urea-formaldehyde (catalyzed) | 580 | .005 |
| Do | Urea-formaldehyde | 450 | .005 |

[1] Grams alumininum/5 min. w. 2 lb. wt.
[2] Inch/per 1,0005 min. w. 2 lb. wt.

In order to evaluate the resistance of the compositions of the present invention to water, oil and heat several of the compositions were tested by using the ASTM Methods E-28-58T and D-36-64T commonly referred to as "ring & ball" methods, after drying overnight at 230° F. The thin film discs of the compositions were placed on a standard brass ring and a standard steel ball was placed on the disc. The complete ring, disc and ball apparatus was placed in a selected liquid medium which was raised in temperature until the disc ruptured under the weight of the ball and the ball fell through the ring.

The results obtained are shown in the following Table II:

| Example No. | Water resistance immersion in boiling water | Mineral oil-heat resistance, mins. | Glycerin-solvent and heat resistance, mins. |
|---|---|---|---|
| Example No.: | | | |
| 7 | 60 hours | 21 (195° C.) | 18.3 (165°) |
| 8 | do | 23 (205° C.) | 22 (190°) |
| 9 | do | 21 (205° C.) | 20 (190°) |
| Urea-formaldehyde | 2 hours | 17 (200° C.) | 17 (180°) |
| Glue alone | 2 minutes | 10 (200° C.) | Chars rapidly |

In order to evaluate the water absorption characteristics of the composition of the present invention thin discs of the compositions of Example 7 and Example 8 were cut uniformly and weighed. Each was placed in distilled water at ambient conditions for 1 hour. They were then removed, patted dry with paper towels and reweighed. This test was repeated for a 16 hour period. The results of the water absorption tests are given in the following Table III:

TABLE III

| Example | 7 | 8 |
|---|---|---|
| Original weight, g | .7590 | 0.9200 |
| Weight after 1 hour immersion, g | 0.7590 | 0.9280 |
| Percent gain | 0 | 0.86 |
| Weight after 16 hours immersion, g | 0.7610 | 0.9650 |
| Percent gain | 0.30 | 4.9 |

It will be evident from the foregoing data of Tables I–III that the compositions of the present invention exhibit marked resistance to water, oil, heat and abrasion. Also, the compositions when heated to a moderate temperature (100° F.) are polymerized and rendered insoluble in water, resistant to penetration by water and oil, while remaining flexible, heat resistant and adherent to a wide variety of surfaces, including vitreous surfaces such as glass and silica particles, paper, wood and metal. Among the applications for the composition of the present invention as an adhesive are the manufacture of paper tapes, plywood, wood laminations, paper barrier coatings, and particularly as a binder for sandpaper.

The resin compositions having the formulations of the foregoing specific examples can also be used as the adhesive binder for particle board. Particle board is composed essentially of wood shavings or chips and pieces of "round" wood having dimensions approximately 0.25 by 0.125 and 0.12 inch. The wood particles are mixed in a pug mill and sprayed with a fine mist of adhesive binder and a paraffin wax emulsion. The amount of adhesive binder used comprises about 8% resin solids based on the dry wood solids, and the amount of wax used is about 1% wax solids based on the dry wood solids. The wood chips and rounds having the adhesive binder and wax emulsion applied thereto are formed into boards of the desired shape within about 45 minutes of mixing and are then pressed in a heated press for approximately 8 minutes at a pressure of 500 p.s.i. and at a temperature of about 300° F.

As an example of the use of a resin composition of the present invention in the manufacture of particle board, 6545 grams of bone dry wood chips are mixed with 455 grams of water to provide 7000 grams of wood particles having a moisture content of 6.5%. The moistened wood particles are then sprayed with about 868.2 grams of the resin composition of specific Example 11 admixed with 145.4 grams of a 50% paraffin wax emulsion (Hercules Paracol N.—Hercules Powder Company) which provides wax solids comprising but 1% of the wood chip solids. The amount of resin composition used contains about 425.4 grams of resin solids which comprises about 6.5% of the dry wood particles. After uniform mixing in a pug mill, the mixture is formed into a particle board and pressed for 7.5 minutes in a heated press at a temperature of 325° F. and a pressure of 500 p.s.i.

Considerable variations can be made by one skilled in the art of preparing particle board to obtain special properties in the particle board product by adjusting the moisture content of the material, the amount of resin applied to the material, and the pressure, temperature and length of time the material is held in the heated press.

In Examples 1, 3, 4, and 8 the "Airco-Flex-400" product is an esterified polyethylene aqueous emulsion containing 55% solids which is sold by the Airco Chemicals and Plastics Company, and while not reactive with any of the ingredients, has been found to improve the flexibility properties of the resin.

While animal glue, and particularly animal bone blue, has been used as the water soluble animal protein material in the specific examples, other equivalent water soluble animal protein material, such as gelatin and blood protein, can be used in place of the glue in preparing the resin compositions of the present invention. Also, in place of the urea and its analogue thiourea used in the examples, one can use an amine, such as guanadine or melamine. And, in place of the aqueous stabilized solution of formaldehyde or the 37% aqueous formaldehyde solution used in the specific examples, other equivalent solutions of formaldehyde or gaseous formaldehyde can be used in the present invention.

We claim:

1. A thermosetting protein resin composition comprising; a reaction mixture of a water soluble animal protein, a water soluble carbamide and a water soluble aldehyde, wherein said protein and said carbamide are present in a weight ratio of protein to carbamide between about 0.7 and 1.5, said protein and said aldehyde are present in a weight ratio of protein to aldehyde between about 0.5 and 2.3, said protein, carbamide and aldehyde are present in the weight ratio of carbamide and aldehyde to protein between about 1.0 and 2.4, and said aldehyde and carbamide are present in a molar ratio of aldehyde to carbamide between about 1.0 and 1.6; and wherein a uniform aqueous solution of said animal protein the molecules of which are altered by reaction with at least about half of said carbamide is chemically reacted at a temperature of at least about 90° and below 110° F. with said aldehyde and any remainder of said carbamide to form a fluid thermosetting protein resin composition.

2. A resin composition as in claim 1, wherein said protein is selected from the group consisting of animal glue, gelatin and animal blood protein; said carbamide is selected from the group consisting of urea, thiourea, guanadine and melamine; and said aldehyde is selected from the group consisting of an aqueous formaldehyde solution and gaseous formaldehyde.

3. A resin composition as in claim 1, wherein said protein is animal glue, said carbamide is urea and thiourea in about equal amounts, and said aldehyde is a stabilized aqueous formaldehyde solution.

4. A resin composition as in claim 1, wherein said aqueous solution of a said animal protein comprises an animal glue containing at least about half of said carbamide, said carbamide comprising urea and thiourea in about equal molar proportions, and said aldehyde comprising an aqueous solution of formaldehyde.

5. A resin composition as in claim 4, wherein all of said thiourea is contained in said aqueous solution of said glue.

6. A resin composition as in claim 1, wherein said aldehyde and said carbamide are present in a molar ratio of aldehyde to carbamide of about 1.3.

7. A resin composition as in claim 1, wherein said temperature is between 90° F. and 100° F.

8. A method of producing a thermosetting protein resin composition which comprises reacting a carbamide compound with a water soluble animal protein in an aqueous solution while heating to effect forming a uniform aqueous reaction solution, adding a water soluble aldehyde to said reaction solution while said reaction solution is at a temperature of at least about 90° and below 110° F., and mixing said reaction solution and said aldehyde to form a homogeneous thermosetting resin composition, and maintaining the weight ratio of said protein to said carbamide between about 0.7 to 1.5, the weight ratio of said protein to said aldehyde between about 0.5 and 2.3 and the weight ratio of the total of said carbamide and aldehyde to said protein between about 1.0 and 2.4.

References Cited

UNITED STATES PATENTS

| | | | |
|---|---|---|---|
| 2,075,276 | 3/1937 | Ellis | 260—6 |
| 2,133,335 | 10/1938 | Wilson et al. | 260—6 |
| 2,249,003 | 7/1941 | Julian et al. | 260—6 |
| 2,332,802 | 10/1943 | Leonardson et al. | 260—6 |
| 2,534,806 | 10/1950 | Webber et al. | 260—6X |
| 2,541,440 | 2/1951 | Schibler | 260—6 |
| 2,618,017 | 11/1952 | Happé | 260—6X |
| 2,940,863 | 6/1960 | Bennett et al. | 260—6X |
| 2,203,501 | 6/1940 | Menger | 260—6 |
| 2,098,083 | 11/1937 | Bowen et al. | 260—6 |
| 2,249,003 | 7/1941 | Julian | 260—123.5UX |
| 2,338,602 | 1/1944 | Schur | 260—6X |
| 2,586,098 | 2/1952 | Schibler | 260—6 |

WILLIAM H. SHORT, Primary Examiner

H. SCHAIN, Assistant Examiner

U.S. Cl. X.R.

117—124, 128.4, 132, 148, 155, 161; 260—117

UNITED STATES PATENT OFFICE
CERTIFICATE OF CORRECTION

Patent No. 3,598,773           Dated  August 10, 1971

Inventor(s) Thomas F. Mitchell and Algird S. Pakeltis

It is certified that error appears in the above-identified patent and that said Letters Patent are hereby corrected as shown below:

Col. 7, line 9, after "ence" add --in thickness--;
Col. 7, Footnote 2 following Table I should read --Inch/1000 per 5 min. w. 2 lb.wt.--.

Signed and sealed this 18th day of January 1972.

(SEAL)
Attest:

EDWARD M. FLETCHER, JR.          ROBERT GOTTSCHALK
Attesting Officer                Acting Commissioner of Patents